Dec. 28, 1948.　　　　　M. ALDEN　　　　　2,457,113
SCANNING UNIT

Filed June 26, 1945　　　　　　　　　　　2 Sheets-Sheet 1

Inventor
Milton Alden
by Roberts, Cushman & Grover
att'ys.

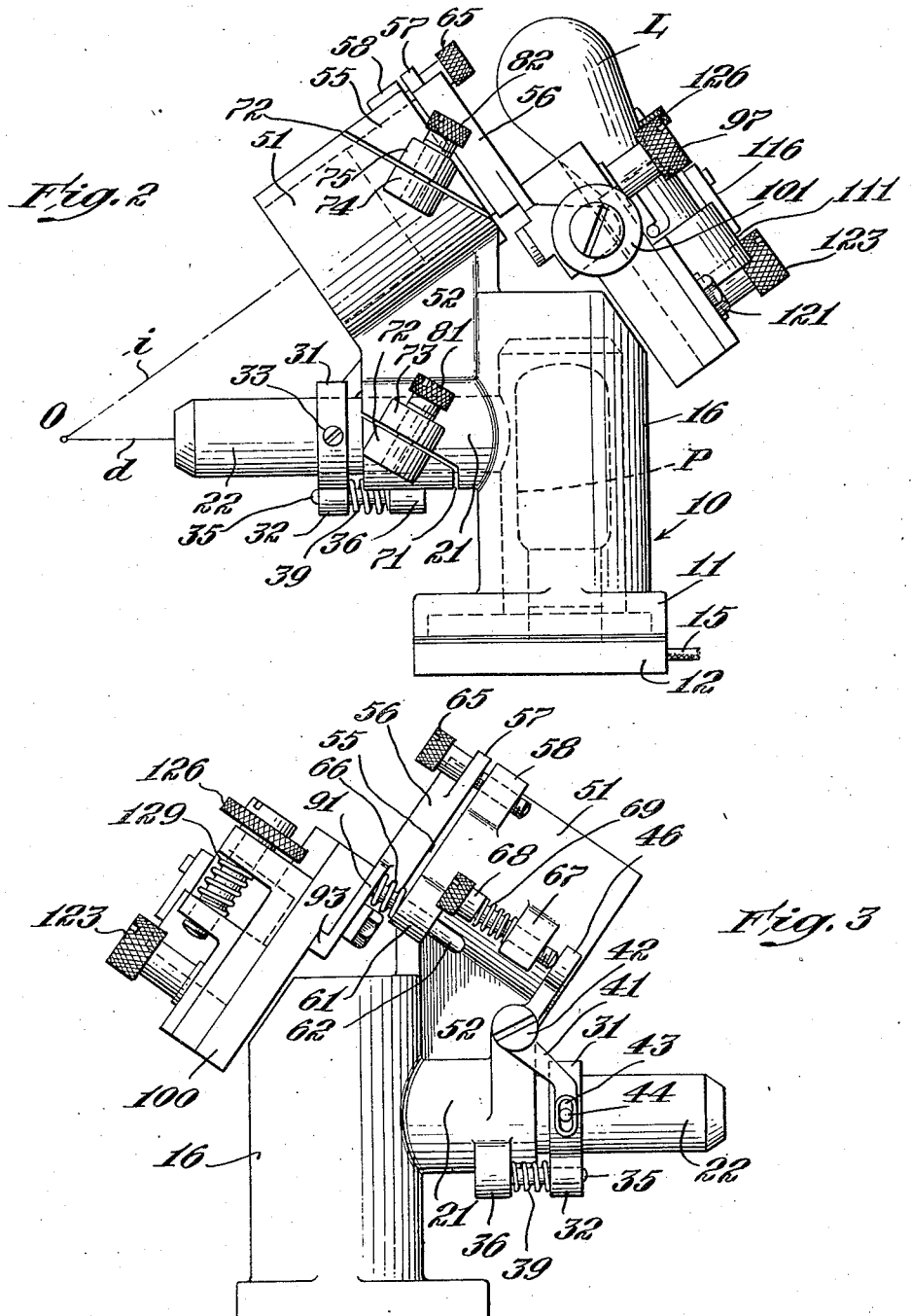

Patented Dec. 28, 1948

2,457,113

UNITED STATES PATENT OFFICE 2,457,113

SCANNING UNIT

Milton Alden, Brockton, Mass.

Application June 26, 1945, Serial No. 601,702

5 Claims. (Cl. 250—41.5)

This invention relates to scanning units and particularly to scanning units of the type wherein a beam of light is concentrated on an article to be supervised or scanned, and light reflected from a comparatively small illuminated area of the article directed toward a detecting device which is sensitive to changes in light intensity.

Scanning arrangements for the above indicated purpose have in most cases heretofore been composed of separate illuminating and detecting elements mounted on different parts of the apparatus which they serve, or they have been incorporated in especially designed units fitted to the particular function of that apparatus without much regard to exact and convenient adjustment for the purpose at hand, and for permanent fixation of that adjustment.

It is the main object of the present invention to provide a self-contained scanning unit that is suitable for photoelectric detection work which employs a reflected beam supervising a comparatively small area at a comparatively critically located point, which unit can be used not only for a specific purpose but for all types of such work, as facsimile scanning, or automatic electric control such as supervising the side travel or register in web or strip material handling machinery, or indicating, separating or counting articles. Other objects are to provide such a unit the elements of which are so selected and grouped as to the permanent and adjustable joints therebetween, that optimum rigidity, permanency of adjustment, and ease of readjustment are secured. Still another object is to provide such a scanning unit which is designed with a view to permanency of the alignment of its optical axes, while permitting all adjustments necessary for proper and exact operation. Further objects are to provide a scanning unit which can be easily adjusted without the use of tools and wherein such adjustment can be effectively and conveniently fixated to eliminate readjustment so long as the unit is used for the purpose for which it was set up; to provide such a unit wherein the arrangement of adjustment and fixation controls promotes easy accessibility and manipulation; to provide a scanning unit which inherently protects its most delicate component namely the detecting element group; and to provide such a unit which permits the use of standard, comparatively inexpensive lamps of non matching dimensions, the unit according to the invention permitting easy, quick, and yet very exact alignment of such a light source.

In one of its aspects, the invention accomplishes such objects by providing a self-contained unitary mounting block which defines the optical axis of the broken light beam, and houses the light-receiving element such as a photoelectric cell whose alignment is not critical, whereas the element whose alignment is critical, namely the light source, is mounted on a platform which is movable relatively to the optical system for the unreflected or illuminating beam, axially for focusing, as well as transversely for adjustment in a plan intersecting the axis of that system. In another aspect, the unit according to the invention permanently defines the location of the intersecting optical axes of the two branches of the scanning beam whereas all adjustment movements, and the fixation of such adjustment, are taken care of by screws which point toward, and are manipulated within a comparatively small space at the most accessible region of the unit, so that adjustment and fixation can be carried out with a minimum of hand movement and interference with other portions of the apparatus. Still another feature of the invention is a construction which permits incorporation of only positive movement for all adjustments by means of screws, which provides for optimum speed and certainty of adjustment and operation.

These and other objects, aspects, and features will be apparent from the following description of an embodiment illustrating the characteristics of the invention. This description refers to drawings in which:

Fig. 2 is a side elevation of a scanning unit according to Fig. 1;

Fig. 3 is an elevation similar to that of Fig. 1, but seen from the opposite side;

Figure 1:
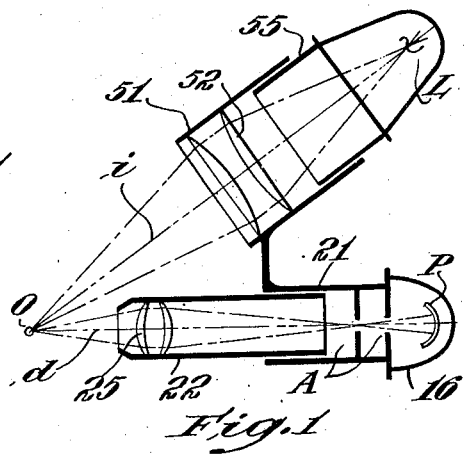
Fig. 1 is a schematic cross section illustrating the general arrangement of the elements of the scanning unit according to the invention.

As indicated in Fig. 1, a unit according to the invention incorporates a detector base or housing 16 opening into a mount 21 for the optical system of the detector, such as aperture system A, which limits the detecting light beam and, together with an enlarging lens system 25 defines the optical axis $d$ of that beam, which it directs towards the cathode P of a phototube on base 16. The lens system 25 is secured in a tube 22 that is adjustably supported on mount 21. The detector mount 16 and the detector system mount 21 are rigidly connected to a mount 51 for an optical system 52 which directs an illuminating light beam with axis $i$ from the filament of a lamp L towards the scanning or detecting area defined by the point O where axes $d$ and $i$ intersect. The light source L is mounted on a holder 55 which is adjustable relatively to mount 51 in the manner to be described in detail below.

As shown in Figs. 2 and 3, all the elements of the unit are grouped around and mounted upon a mounting and aligning block 10, for example a bronze casting, which has a base plate or flange 11 which can be fastened to the apparatus in which the unit is incorporated. The base plate 11 is formed integral with a tubular member 16 which houses the phototube P mounted therein with conventional means, for example on insulating block 12 with electric wires 15 leading to the phototube.

At right angles to and integral with tubular member 16 is arranged an aperture tube 21 which may contain the aperture elements A shown in Fig. 1, for reducing and locating the area which is observed by the phototube, or analogous beans for that purpose. Slidingly fitted into aperture tube 21 is a lens tube 22 which carries the detecting lens system 25 (Fig. 1). A ring 31 with a perforated base 32 is fastened to tube 22, for example with a set screw 33, the perforation fitting a pin 35 fastened to a boss 36 of aperture tube 21. A spring 39 tends to move tube 22 outwardly, within tube 21 This movement is controlled by a linkage system incorporating a bell crank 41, which is pivoted at 42 on aperture tube 21, has on one arm an oblong hole 43 engaging a pin 44 of tube 22, and on the other arm a flat portion 46, which rests against an adjustment screw 68 to be described hereinbelow.

A further integral portion of the mounting block 10 constitutes an illuminating lens system tube 51. A web 52 joins the three tubes, namely photocell tube 16, aperture tube 21, and lens tube 51, which construction provides an extremely rigid casting. The lens tube 51 carries by conventional means a lens system, for example the condenser lenses 52 indicated in Fig. 1.

Figure 5:
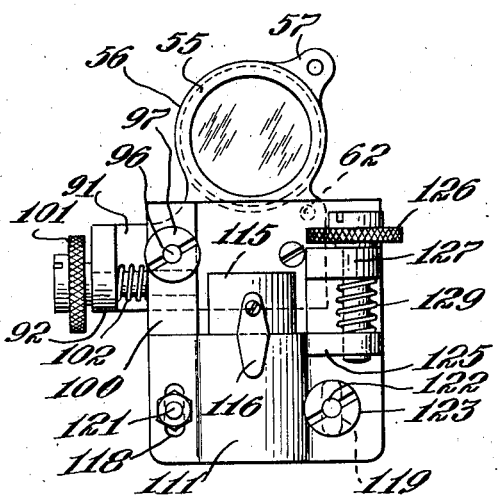
Fig. 5 is a top view of the lamp bridge seen from above in the direction of axis $i$.

Slidingly fitted within illuminating tube 51 is a lamp holder tube 55 (Fig. 5). Tube 55 is provided with a flange 56 having a boss 57 opposite and corresponding to a boss 58 (Fig. 3), of the lens system tube 51. Tube 51 also has a boss 61, wherein slides a pin 62 (Fig. 5) which is screwed into the platform extension 91 of flange 56 to be described hereinbelow. Boss 58 of tube 51 is threaded for adjustment screw 65, (Fig. 3) which acts against the force of a spring 66 coiled around pin 62 between boss 61 and platform 91 and tending to move flange 56 away from tube 51.

Illuminating tube 51 also has a boss 67 (Fig. 3) which is threaded to receive an adjustment screw 68, the end of which rests against the flat portion 46 of bell crank 41, described above. Spring 39 of pin 35 presses the flat 46 against screw 68, so that turning of the latter provides positive adjustment of tube 22 within tube 21. A friction spring 69 assists in arresting screw 68 when not in use.

Similarly, manipulation of screw 65 against the tension of spring 66 provides positive adjustment of lamp holder tube 55 within illuminating tube 51.

Aperture tube 21 as well as illuminating tube 51 are provided with saw cuts 71 and 72, respectively, (Fig. 1) which are flanked by bosses 72, 73 and 74, 75 respectively. Clamping screws 81 and 82 are screwed into bosses 72 and 74, respectively. Tightening of these screws presses the partly separated portions of tubes 21 and 51 towards each other, thereby firmly fixating tubes 22 and 55, respectively, therein.

Figure 4:
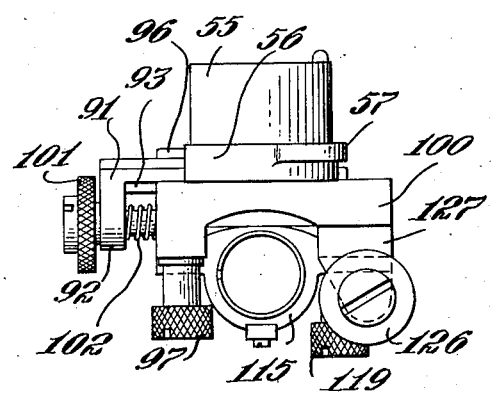
Fig. 4 is a view of the lamp bridge seen from above in the direction normal to axis $i$.
Figure 6:
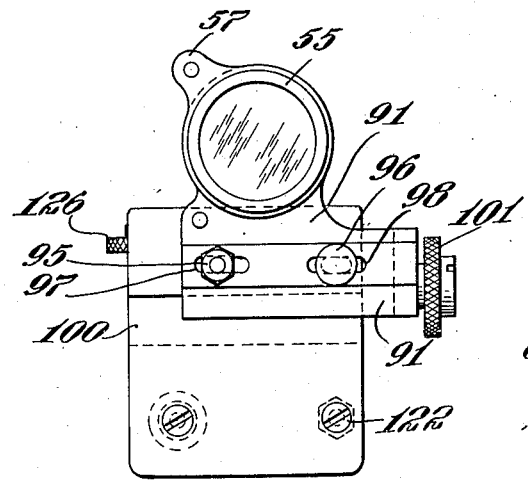
Fig. 6 is a view similar to Fig. 5 but seen from the opposite direction.

Integral with flange 56 is a platform 91 (Figs. 4 to 6), which is provided with a boss 92 and a guide key 93 (Fig. 3). Supported on the key 93 and held on the platform 91 by means of screws 95 and 96, which extend through slots 97 and 98 of platform 91 is a lamp support plate 100. Screw 96 has a flat shank and is provided with a knurled nut 97 which permit fixation of support plate 100 on platform 91. A horizontal adjustment screw 101 is slidingly fitted into a hole of boss 92 of platform 91 and threaded in support plate 100, a spring 102 keeping the knurled head of screw 101 in contact with boss 92. On its outer side, support plate 100 carries a lamp socket holder 111 to which the lamp socket 115 is fastened by means of a clamp 116 (Fig. 5). The socket holder 111 has two slots 118 and 119, which guide the holder on two screw bolts 121 and 122 respectively. One of these screws, namely 122, is fixed in plate 100 (Fig. 6) and has a knurled nut 123, Figs. 2 and 5, which when tightened, clamps the socket holder plate 111 firmly against support plate 100. Lamp socket plate 111 also has a threaded boss 125, which engages screw 126 which turns in boss 127 of support plate 100, spring 129 keeping the head of screw 126 in contact with boss 127 (Figs. 4 and 5). Rotation of screw head 126 moves socket plate 111 along slots 118 and 119 on plate 100, whereas tightening of screw 123 fixates the socket plate.

The above described scanning unit is operated in the following manner.

The mounting block is fastened, by means of flange plates 11, 12, to the apparatus which it serves, with the intersection point O of axes $d$ and $i$ on the area to be supervised. After loosening screws 81, 82, 97 and 123, the filament of lamp L is focused at O, by means of adjustment screws 65, 101 and 126. By means of screw 68, the lens system 25 is then adjusted to direct towards the photocell P the light reflected from the spot of light at O, on the object to be supervised or scanned.

The fixating screws 81, 82, 97 and 123 are then tightened, whereupon the unit is ready for operation.

When the lamp L has to be replaced, the new lamp does not have to match the old lamp; its filament can be adjusted as above described in order to place it into correct position without moving the unit itself in any respect. Replacement of the phototube similarly might require refocusing by means of screw 68, while, due to the nature of the cathode, adjustment in a plane normal to axis $d$ is not required.

It should be understood that the present disclosure is for the purpose of illustration only and that this invention includes all modifications and equivalents which fall within the scope of the appended claims.

I claim:

1. A self-contained scanning unit incorporating a lamp and a light detector which supervises through an optical system an object illuminated by the lamp through another optical system, comprising a unitary mounting block having means for securing it to a support and carrying above said securing means integrally therewith a lamp system mount, a detector system mount and a detector housing, said mounts rigidly and permanently securing intersection of the axes of said systems; a lamp platform secured to said lamp system mount for movement along and defining a plane substantially normal to said lamp system axis; means for positively driven adjustment of said platform along said lamp system axis; a lamp base slidingly mounted on said platform; means for positively driven adjustment of said base in two intersecting directions within said plane; means for rigidly fixating said platform and said lamp base in adjusted position; a detector lens system supported on said detector system mount for movement along said detector system axis; and means for positively adjusting and fixating the position of said detector lens system; said adjusting and fixating means having manual controls which terminate in close proximity to each other near the free end of said block substantially opposite said securing means.

2. A self-contained scanning unit comprising: an aligning block having a tubular body portion, constituting a phototube housing; means for mounting said unit arranged on one side of said housing; a tube containing an illuminating lens system arranged on the other side of said housing; a tube containing aperture means laterally extending from and opening into said housing between said mounting means and said illuminating tube; a tube containing a detecting lens system slidingly supported in said aperture tube, said aperture means and said detecting lens system defining a phototube axis which intersects the axis of said illuminating lens system; a holder including a lamp platform and a holder tube slidingly supported within said illuminating tube; lamp support means slidingly mounted on said platform and arranged for movement in two directions relatively thereto, said detecting tube, said holder tube and said lamp support means each being associated with means for adjusting their positions relatively to the respective supports; and means for actuating said adjusting means, said actuating means being located in close proximity to each other substantially on one side of said lamp platform holder.

3. A self-contained scanning unit comprising: an aligning block having a tubular body portion constituting a phototube housing; means for mounting said unit arranged on one side of said housing; a tube cotaining an illuminating lens system integral with said body portion on the other side of said housing; a tube containing aperture means laterally extending from and opening into said housing between said mounting means and said illuminating tube; a tube containing a detecting lens system slidingly mounted in said aperture tube, said aperture means and said detecting lens system defining a phototube axis which intersects the axis of said illuminating lens system; a holder including a lamp platform and substantially normal thereto a holder tube adapted to slide within said illuminating tube, said illuminating and platform tubes and said platform straddling said housing; means for adjusting the position of said holder tube within said illuminating tube for focusing a lamp on said platform; a lamp support plate slidingly mounted on said platform and a second support plate slidingly mounted on said first plate for movement crosswise to the movement of the first plate, each support plate having means for adjusting its position relatively to said platform and said first plate, respectively, for carrying out said movements; means for slidingly adjusting said detecting lens system tube within said aperture tube for moving said detecting lens system relatively to said aperture means; and means for actuating said adjusting means, said actuating means being located in close proximity to each other substantially on the outer side of said lamp platform holder opposite said mounting means.

4. A self-contained scanning unit comprising: a unitary mounting block having a base flange, a tubular phototube housing extending from said flange, extending substantially normally from said housing and opening thereinto a tube containing optical aperture means, and a tube containing an illuminating lens system extending obliquely to said housing and said aperture tubes on the side opposite to said base; a lamp platform mounted on a lamp holder tube which is adapted to slide within said illuminating tube and which is substantially normal to said illuminating axis, said platform and illuminating tube straddling said housing tube; a screw threaded in a boss of said illuminating tube and rotatably affixed to said platform tube; spring means tending to separate said illuminating and said platform tubes; said illuminating tube having an oblique cut and a screw for compressing it thereby fixating said platform; a support plate slidingly mounted on said platform and a second support plate slidingly mounted on said first plate for movement normal to the movement of the first plate, each support plate having an adjustment screw threaded in said platform and said first plate, respectively, for carrying out said movements, and each plate having a clamping screw for arresting it relatively to said platform and said first plate, respectively; each of said adjustment and clamping screws having a control head in close proximity of the other heads within an area substantially on the same side of said housing and said aperture tube, opposite said flange.

5. A self-contained scanning unit comprising: a unitary mounting block having a base flange, a tubular phototube housing extending from said flange, extending substantially normally from said housing and opening thereinto a tube containing optical aperture means, and a tube containing an illuminating lens system extending obliquely to said housing tube and said aperture tube on the side opposite to said base; slidingly mounted in said aperture tube a tube carrying a detecting lens system, said aperture means and said lens system defining a detecting axis which is intersected by the axis of said illuminating tube; a lamp platform mounted on a lamp holder tube which is adapted to slide within said illuminating tube and which is substantially normal to said illuminating axis, said holder and illuminating tube straddling said housing tube; a screw threaded in a boss of said illuminating tube and rotatably affixed to said holder tube; spring means tending to separate said illuminating and said holder tubes; said illuminating tube having an oblique cut and a screw for compressing it thereby fixating said lamp holder tube and said platform; a support plate slidingly mounted on said platform and a second support plate slidingly mounted on said first plate for movement normal to the movement of the first plate, each support plate having an adjustment screw threaded in said platform and said first plate, respectively, for carrying out said movements, and each plate having a clamping screw for arresting it relatively to said platform and said first plate, respectively; and a linkage system for moving said detecting lens system tube relatively to said aperture tube and including an actuating screw mounted on said illuminating tube; said aperture tube having an oblique cut and a screw for compressing it thereby fixating said detecting tube; each of said adjustment and clamping screws having a control head in close proximity of the other heads within an area substantially on the same side of said housing and said aperture tube, opposite said flange.

MILTON ALDEN.

REFERENCES CITED

The following references are of record in the file of this patent:

UNITED STATES PATENTS

| Number | Name | Date |
|---|---|---|
| 1,257,128 | Sheck | Feb. 19, 1918 |
| 1,354,583 | Skerrett | Oct. 5, 1920 |
| 1,764,368 | Thomas | June 17, 1930 |
| 1,910,556 | McFarlane et al. | May 23, 1933 |
| 1,922,188 | Zworykin | Aug. 15, 1933 |
| 2,022,327 | Sheldon | Nov. 26, 1935 |
| 2,127,477 | Carpenter et al. | Aug. 16, 1938 |
| 2,197,514 | Barnes | Apr. 16, 1940 |
| 2,242,317 | Metcalf | May 20, 1941 |